(12) United States Patent
Jeong et al.

(10) Patent No.: US 11,639,148 B2
(45) Date of Patent: May 2, 2023

(54) ROOF MOUNTED AIRBAG

(71) Applicant: HYUNDAI MOBIS CO., LTD., Seoul (KR)

(72) Inventors: Ga Ram Jeong, Yongin-si (KR); Hae Kwon Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/375,070

(22) Filed: Jul. 14, 2021

(65) Prior Publication Data

US 2022/0017036 A1 Jan. 20, 2022

(30) Foreign Application Priority Data

Jul. 17, 2020 (KR) .................. 10-2020-0088768
Jul. 17, 2020 (KR) .................. 10-2020-0088800

(51) Int. Cl.
*B60R 21/214* (2011.01)
*B60R 21/232* (2011.01)
(Continued)

(52) U.S. Cl.
CPC .......... *B60R 21/214* (2013.01); *B60R 21/232* (2013.01); *B60R 21/2338* (2013.01);
(Continued)

(58) Field of Classification Search
CPC ............... B60R 21/214; B60R 21/232; B60R 2021/23308; B60R 2021/23386; B60R 21/2338
See application file for complete search history.

(56) References Cited

U.S. PATENT DOCUMENTS 2,834,606 A * 5/1958 Bertrand ............... B60R 21/268
D12/400
7,347,450 B2 3/2008 Williams et al.
(Continued)

FOREIGN PATENT DOCUMENTS

JP 6219389 B2 10/2017
KR 20210009121 A 1/2021
(Continued)

OTHER PUBLICATIONS

"Notice of Allowance Issued in U.S. Appl. No. 16/921,313", dated Aug. 3, 2021, 15 Pages.
(Continued)

*Primary Examiner* — Paul N Dickson
*Assistant Examiner* — Tiffany L Webb
(74) *Attorney, Agent, or Firm* — NovoTechIP International PLLC (57) ABSTRACT

A roof mounted airbag is proposed. The roof mounted airbag includes: a fixed chamber having an upper portion fixed to a roof of a vehicle and configured to be expanded downward when gas is supplied into the fixed chamber; a first separated chamber connected to the fixed chamber, having an inside that communicates with an inside of the fixed chamber to be supplied with the gas from the fixed chamber, and configured to be expanded downward when the gas is supplied into the first separated chamber; and a second separated chamber connected to the fixed chamber while being spaced apart from the first separated chamber, having an inside that communicates with the inside of the fixed chamber to be supplied with the gas from the fixed chamber, and configured to be expanded downward when the gas is supplied into second separated chamber.

15 Claims, 7 Drawing Sheets

(51) Int. Cl.
    *B60R 21/2338* (2011.01)
    *B60R 21/231* (2011.01)
    *B60R 21/233* (2006.01)
(52) U.S. Cl.
    CPC ............... *B60R 2021/23161* (2013.01); *B60R 2021/23308* (2013.01); *B60R 2021/23386* (2013.01)

(56) References Cited

U.S. PATENT DOCUMENTS

| | | | |
|---|---|---|---|
| 7,597,355 B2 | 10/2009 | Williams et al. | |
| 8,191,925 B2 | 6/2012 | Williams | |
| 8,500,165 B2 | 8/2013 | Kwon | |
| 8,505,966 B2 | 8/2013 | Yoo | |
| 8,646,808 B2 | 2/2014 | Williams | |
| 9,108,590 B2 | 8/2015 | Williams | |
| 9,150,189 B1 | 10/2015 | Nelson et al. | |
| 9,393,927 B2 | 7/2016 | Kim | |
| 9,758,124 B2 | 9/2017 | Kruse | |
| 9,873,402 B2 | 1/2018 | Saito | |
| 10,688,955 B2 * | 6/2020 | Shin | B60R 21/214 |
| 11,059,449 B2 * | 7/2021 | Jayakar | B60R 21/214 |
| 11,117,543 B2 * | 9/2021 | Jimenez | B60R 21/232 |
| 11,267,431 B2 * | 3/2022 | Sekizuka | B60R 21/232 |
| 11,273,786 B2 * | 3/2022 | Ostling | B60R 21/21 |
| 2017/0282841 A1 | 10/2017 | Hayashi et al. | |
| 2019/0241148 A1 | 8/2019 | Shin et al. | |
| 2019/0366968 A1 * | 12/2019 | Park | B60R 21/214 |
| 2020/0017058 A1 | 1/2020 | Jaradi et al. | |
| 2020/0139923 A1 | 5/2020 | Ostling et al. | |
| 2020/0223387 A1 | 7/2020 | Min | |
| 2020/0361410 A1 | 11/2020 | Jayakar et al. | |
| 2021/0031718 A1 | 2/2021 | Schultz et al. | |

FOREIGN PATENT DOCUMENTS

| | | |
|---|---|---|
| WO | 2019168579 A1 | 9/2019 |
| WO | 2019169209 A1 | 9/2019 |
| WO | 2019209442 A1 | 10/2019 |

OTHER PUBLICATIONS

Office Action dated Apr. 29, 2022 in corresponding U.S. Appl. No. 17/377,690.

Office Action dated Aug. 5, 2022 in corresponding U.S. Appl. No. 17/377,690.

* cited by examiner

Fig. 1

Collision direction

Collision direction

ROOF MOUNTED AIRBAG

CROSS-REFERENCE TO RELATED APPLICATIONS

The present application claims priority to Korean Patent Application Nos. 10-2020-0088800 and 10-2020-0088768, both filed on Jul. 17, 2020, the entire contents of which is incorporated herein for all purposes by this reference.

BACKGROUND OF THE INVENTION

1. Field of the Invention

The present invention relates generally to a roof mounted airbag and, more particularly, to an airbag mounted to a roof of a vehicle and expanded downward from the roof of the vehicle.

2. Discussion of Related Art

In general, vehicles have safety devices to safely protect passengers from collision and rollover accidents, and the safety devices include a seat belt restraining the body of a passenger and an airbag mitigating an impact when the passenger collides a vehicle body. The airbag is provided in various parts of the vehicle as needed. Such airbags include a driver seat airbag provided at a steering wheel and a passenger seat airbag provided at an instrument panel of a passenger seat.

Recently, use of autonomous vehicles has increased, and swivel seats are applied to the autonomous vehicles for the convenience of passengers. The swivel seats are adjusted so that a front seat passenger and a rear seat passenger face each other or the front seat passenger and the rear seat passenger face in opposite directions depending on a seat adjustment position, thereby causing the passengers to collide with each other during a collision of the vehicle.

Furthermore, during a collision of the vehicle, an object that flies or slides without restraint may injure the passenger.

In order to solve the above problem, a center airbag that may separate the interior of the vehicle into front and rear spaces has been applied as a conventional airbag. The conventional center airbag is designed based on the assumption that the center airbag is supported by a seatback of the front seat, so the center airbag does not have self-supporting force and has a limit in protecting the passengers.

The foregoing is intended merely to aid in the understanding of the background of the present invention, and is not intended to mean that the present invention falls within the purview of the related art that is already known to those skilled in the art.

BRIEF SUMMARY OF THE INVENTION

Accordingly, the present invention has been made keeping in mind the above problems occurring in the related art, and the present invention is intended to provide a roof mounted airbag that is moved or turned between passengers in a longitudinal direction of a vehicle to prevent injuries caused to the passengers.

A roof mounted airbag may include: a fixed chamber having an upper portion fixed to a roof of a vehicle and configured to be expanded downward when gas is supplied into the fixed chamber; a first separate chamber connected to the fixed chamber, and having an inner space that may be connected to an inner space of the fixed chamber to be supplied with the gas from the fixed chamber, and configured to be expanded downward when the gas is supplied into the first separate chamber; and a second separate chamber connected to the fixed chamber and spaced apart from the first separate chamber, and having an inner space that is connected to the inner space of the fixed chamber to be supplied with the gas from the fixed chamber, and configured to be expanded downward when the gas is supplied into second separate chamber.

The first separate chamber and the second separate chamber may be arranged to be spaced apart from each other, and when the gas supplied into the first separate chamber and the second separate chamber to expand the first separate chamber and the second separate chamber, the first separate chamber and the second separate chamber may be expanded such that a spacing distance between the first separate chamber and the second separate chamber may be gradually increased as extending away from the fixed chamber.

When the gas may be supplied into the first separate chamber and the second separate chamber, the first separate chamber and the second separate chamber may be extended to be inclined in opposite directions to directions in which the first separate chamber and the second separate chamber may face each other.

When pressure is applied from an outside to the first separate chamber or the second separate chamber in an expanded state due to the supplied gas, the first separate chamber or the second separate chamber may be turned or bent based on the fixed chamber in a direction in which one of the first separate chamber and the second separate chamber may be adjacent to another chamber of the first separate chamber and the second separate chamber.

When the gas is supplied into the first separate chamber or the second separate chamber, the first separate chamber or the second separate chamber may be expanded toward the front of a passenger, and have a curved shape in a direction in which the first separate chamber or the second separate chamber may protrude toward the passenger.

An end of the first separate chamber or the second separate chamber in an expanded state due to the supplied gas may be further extended downward than the center of gravity of an upper body of a passenger.

The fixed chamber in an expanded state due to the supplied gas may be located above the center of gravity of a head of a passenger.

The fixed chamber may be located above a head of a passenger in order to prevent an overlap between the passenger's head and the fixed chamber in a height direction of the vehicle.

The first separate chamber or the second separate chamber in an expanded state due to the supplied gas may be configured to be expanded to a portion above the center of gravity of a head of a passenger, and have a placing surface on which the passenger's head is placed.

The roof mounted airbag may include: an inflator configured to generate the gas and to supply the generated gas into the fixed chamber.

The roof mounted airbag may include: a connection tether having a first end connected to a vehicle body or the fixed chamber and a second end coupled to an end of the first separate chamber or the second separate chamber, the connection tether being configured to be extended from an inside or an outside of the first separate chamber or the second separate chamber in a direction parallel to the first separate chamber or the second separate chamber.

The roof mounted airbag may include: a diffuser configured to guide the gas supplied into the fixed chamber toward an end of the first separate chamber or the second separate chamber.

According to the present invention, the roof mounted airbag is turned in the longitudinal direction of the vehicle during a collision of the vehicle, so that it is possible to reduce injuries to the passengers during restraining of the passengers by the airbag.

Furthermore, the roof mounted airbag can protect the passengers therebetween even when the passengers face each other or are in a posture looking the same direction.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all of modifications, equivalents, and substitutions are included in the scope and spirit of the invention.

It will be understood that, although the terms first and/or second, etc. may be used herein to describe various elements, but these elements should not be limited by these terms. These terms are only used to distinguish one element, from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The terminology used herein is for the purpose of describing particular embodiments only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Exemplary embodiments will be described hereafter in detail with reference to the accompanying drawings. Like reference numerals given in the drawings indicate like components.

Figure 1:
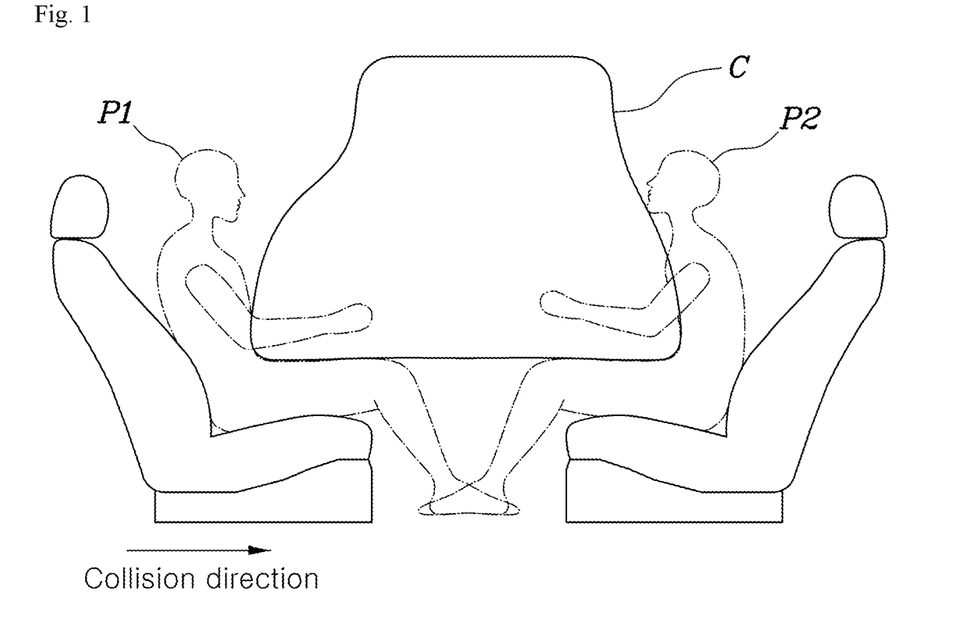
FIG. 1 is a view showing an expanded state of a roof mounted airbag according to the related art.

FIG. 1 is a view showing an expanded state of a roof mounted airbag according to the related art.

Referring to FIG. 1, the roof mounted airbag according to the related art is expanded in a single body type at a portion between passengers. However, the roof mounted airbag is freely rotated in a longitudinal direction of a vehicle because the roof mounted airbag does not have a restraining means restraining movement of an airbag cushion (C) excluding a roof of the vehicle to which an upper portion of the roof mounted airbag is coupled.

In particular, during a collision of the vehicle, the roof mounted airbag is rotated to be moved along a collision direction before restraining of the head of a passenger (P1) by the airbag cushion, the neck of the passenger (P1) may be injured.

Figure 2:
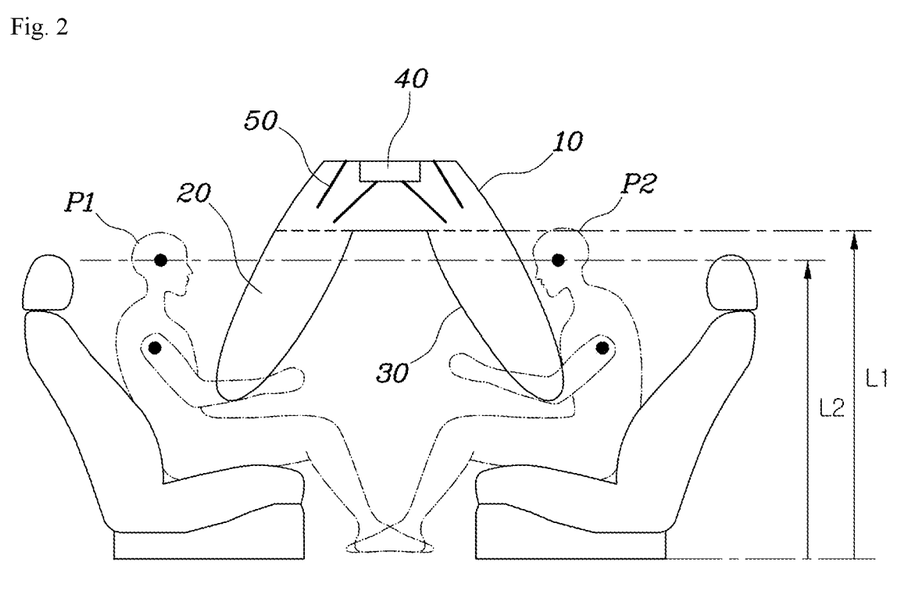
FIG. 2 is a view showing an expanded state of a roof mounted airbag according to an embodiment of the present invention.
Figure 3:
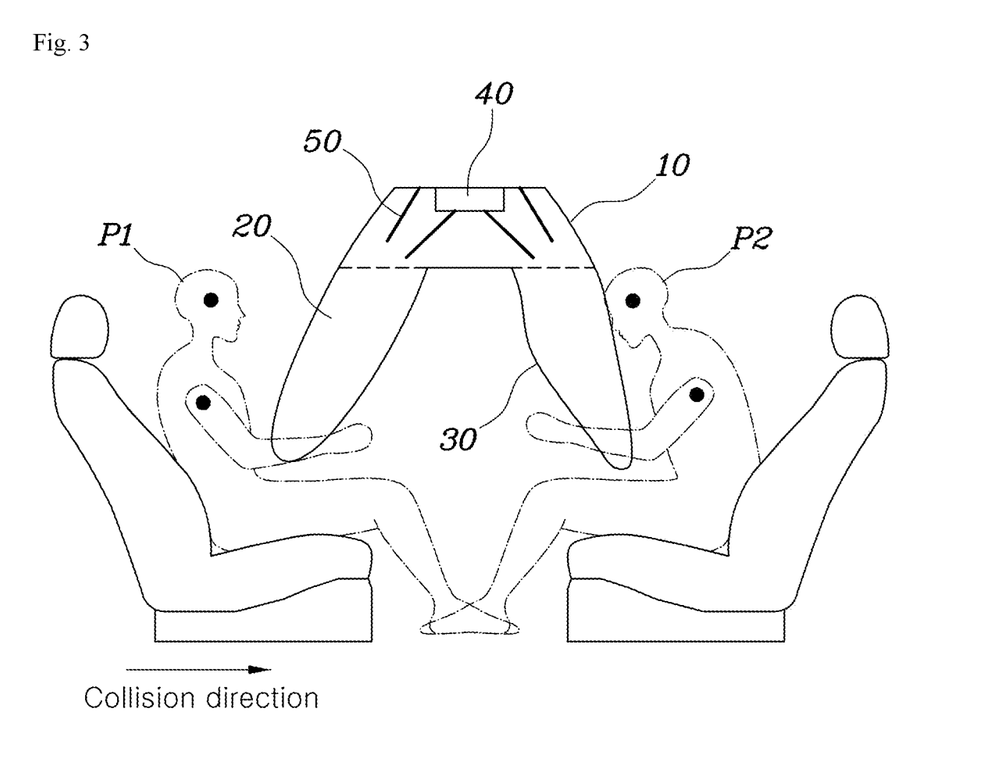
FIG. 3 is a view showing a state during restraining of a passenger by the roof mounted airbag of the present invention.

FIG. 2 is a view showing an expanded state of a roof mounted airbag according to an embodiment of the present invention. FIG. 3 is a view showing a state during restraining of a passenger by the roof mounted airbag of the present invention.

Referring to FIGS. 2 and 3, according to the embodiment of the present invention, the roof mounted airbag includes: a fixed chamber 10 having an upper portion fixed to a roof of a vehicle and configured to be expanded downward when gas is supplied into the fixed chamber; a first separate chamber 20 connected to the fixed chamber 10, having an inner space that is connected to an inner space of the fixed chamber 10 to be supplied with the gas from the fixed chamber 10, and configured to be expanded downward when the gas is supplied into the first separate chamber 20; and a second separate chamber 30 connected to the fixed chamber 10 while being spaced apart from the first separate chamber 20, having an inner space that is connected to the inner space of the fixed chamber 10 to be supplied with the gas from the fixed chamber 10, and configured to be expanded downward when the gas is supplied into the second separate chamber 30.

The fixed chamber 10 may be directly coupled to the roof of the vehicle or fixed thereto while being coupled to a separate fastening means. Specifically, an upper end of the fixed chamber 10 may be fixed to the roof of the vehicle.

When the gas is generated in an inflator 40, which will be described later, the gas may be supplied preferentially into the fixed chamber 10.

The first separate chamber 20 and the second separate chamber 30 may be partitioned such that the inner spaces thereof are connected to the inner space of the fixed chamber 10. The first separate chamber 20 and the second separate chamber 30 may be formed separately from the fixed chamber 10 and separately coupled to a lower end of the fixed chamber 10, and may be formed into an integrated body and share an integrated inner space. The first separate chamber 20 and the second separate chamber 30 may be chambers expanded downward from the lower end of the fixed chamber 10.

The first separate chamber 20 and the second separate chamber 30 may be expanded from a location between passengers facing each other toward the front of each passenger.

In other words, the first separate chamber 20 and the second separate chamber 30 may be expanded between the passengers facing each other to prevent a collision between the passengers facing each other.

In detail, the first separate chamber 20 and the second separate chamber 30 may be disposed to be spaced apart from each other, and be expanded such that a spacing distance between the first and second separate chambers is increased as the distance goes downward when the first and second separate chambers are expanded by the gas supplied therein.

The first separate chamber 20 and the second separate chamber 30 may be independently connected to the fixed chamber 10 and may be separated without connection therebetween. Specifically, the first separate chamber 20 and the second separate chamber 30 may be arranged to be spaced apart from each other and be respectively arranged at the front and the rear of the fixed chamber 10.

The first separate chamber 20 and the second separate chamber 30 may be arranged with respective upper ends fixed to the fixed chamber 10 that are adjacent to each other, and the first separate chamber 20 and the second separate chamber 30 may be expanded such that the distance therebetween is increased as the distance goes downward.

When the gas is supplied, the first separate chamber 20 and the second separate chamber 30 may be extended to be inclined in the opposite directions to directions in which the first separate chamber 20 and the second separate chamber 30 face each other.

As the embodiment, the first separate chamber 20 may be extended obliquely toward the front of the vehicle, and the second separate chamber 30 may be extended obliquely toward the rear of the vehicle.

The first separate chamber 20 and the second separate chamber 30 that are expanded between the passengers (P1 and P2) facing each other may be respectively extended to be inclined toward each of the passengers.

When pressure is applied from the outside to the first separate chamber 20 or the second separate chamber 30 in the expanded state due to the supplied gas, the first separate chamber 20 or the second separate chamber 30 may be turned or bent on the fixed chamber 10 in a direction in which the first separate chamber 20 or the second separate chamber 30 are adjacent to each other.

The first separate chamber 20 and the second separate chamber 30 may be expanded toward the front of the passengers (P1 and P2) by being expanded by the gas supplied from the fixed chamber 10 therein. The first separate chamber 20 and the second separate chamber 30 may be rotatably coupled to the fixed chamber 10, and may be rotatable by being bent at portions connected the fixed chamber 10 when the pressure is applied.

In particular, when the pressure of the head or the upper body of the passenger (P1, P2) in a restrained state by the first separate chamber 20 or the second separate chamber 30 is applied, the first separate chamber 20 or the second separate chamber 30 may be turned on the fixed chamber 10.

When the pressure is applied to the first separate chamber 20 or the second separate chamber 30 from the head or the upper body of the passenger (P1, P2) in the restrained state by the first separate chamber 20 or the second separate chamber 30, the first separate chamber 20 or the second separate chamber 30 may be turned in an inward direction, whereby the first separate chamber 20 and the second separate chamber 30 may be turned in the direction in which the first separate chamber 20 or the second separate chamber 30 are adjacent to each other.

The first separate chamber 20 or the second separate chamber 30 may be expanded toward the front of the passenger (P1, P2) when the gas is supplied therein, and may have a form curved to a direction protruding toward the passenger (P1, P2).

The first separate chamber 20 and the second separate chamber 30 may be formed in respective forms protruding forward and rearward. Specifically, surfaces of the first separate chamber 20 and the second separate chamber 30 to which the heads of the passengers (P1 and P2) are placed may be formed in forms convexly protruding toward the passengers (P1 and P2).

An end of the first separate chamber 20 or the second separate chamber 30 in the expanded state due to the gas supplied therein may be further extended downward than the center of gravity of the upper body of the passenger (P1, P2).

The center of gravity of the upper body of the passenger (P1, P2) may be the chest part of the passenger (P1, P2), and the end of the first separate chamber 20 or the second separate chamber 30 may be extended downward further than the center of gravity of the upper body of the passenger (P1, P2), thereby preventing restraining of the upper body by the airbag cushion or a collision between the upper body and the lower body of the passenger (P1, P2).

The passenger (P1, P2) may be a dummy made based on a normal adult male or a dummy made based on the shape of a child or an adult female. The description about the height of the passenger (P1, P2) may be compared, for example, based on a dummy having a height of 180 [cm] and a weight of 80 [kg].

As the embodiment, the fixed chamber 10 in the expansion state by the gas supplied therein may be located at a location (L1) higher than the center of gravity (L2) of the head of the passenger (P1, P2).

As another embodiment, the fixed chamber 10 may be located above the head of the passenger (P1, P2) in order to prevent an overlap between the fixed chamber 10 and the head of the passenger (P1, P2) in a height direction of the vehicle.

On the other hand, the first separate chamber 20 or the second separate chamber 30 in the expansion state by the gas supplied therein may be extended upward higher than the center of gravity of the head of the passenger (P1, P2), and may have the placing surface on which the head of the passenger (P1, P2) is placed.

The fixed chamber 10 having the inflator 40 generating the gas and supplying the gas into the fixed chamber 10 is located above the head of the passenger (P1, P2) to prevent a collision between the head of the passenger (P1, P2) and the fixed chamber 10 during restraining of the head of the passenger (P1, P2) by the fixed chamber 10. Contrarily, each of the first separate chamber 20 and the second separate chamber 30 is extended toward the upper side higher than the head of the passenger (P1, P2), so that during restraining of the head of the passenger (P1, P2) by the airbag, the first separate chamber 20 or the second separate chamber 30 may collide with the head of the passenger (P1, P2).

Accordingly, the head of the passenger (P1, P2) does not collide with the fixed chamber 10 firmly fixed, and may collide with the first separate chamber 20 or the second separate chamber 30 that are relatively freely turned.

The roof mounted airbag may include the inflator 40 generating the gas and supplying the generated gas into the fixed chamber 10.

The inflator 40 may be located inside the fixed chamber 10 or be connected to the fixed chamber 10 at the outside of the fixed chamber 10 to inject the gas into the fixed chamber 10. The inflator 40 may be fixed to the roof of the vehicle. The inflator 40 may generate the gas in a short time when a vehicle collision signal is input, and may supply the gas into the fixed chamber 10.

The roof mounted airbag may include a diffuser 50 guiding the gas supplied into the fixed chamber 10 to the end of the first separate chamber 20 or the second separate chamber 30.

The diffuser 50 may guide the gas generated from the inflator 40 to flow into the first separate chamber 20 and the second separate chamber 30 before the fixed chamber 10. In particular, the diffuser 50 may be extended in a cylinder shape, and may have a first opening connected to the inflator 40 and a second opening connected to the first separate chamber 20 or the second separate chamber 30.

Therefore, the gas generated from the inflator 40 is supplied into the first separate chamber 20 and the second separate chamber 30, so that the first separate chamber 20 and the second separate chamber 30 may be quickly expanded, and the fixed chamber 10 may be supplied with the gas after the first separate chamber 20 and the second separate chamber 30 are expanded.

Figure 4:
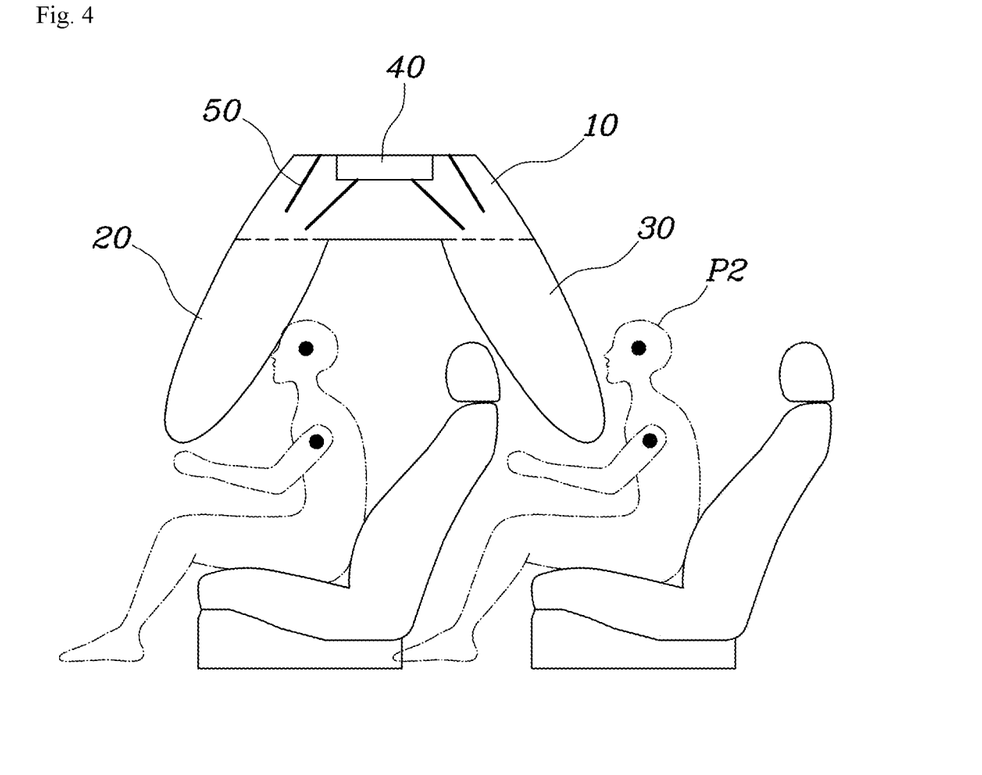
FIG. 4 is a view showing the passengers when the roof mounted airbag according to the embodiment of the present invention is expanded.

FIG. 4 is a view showing the passengers when the roof mounted airbag according to the embodiment of the present invention is expanded.

Referring to FIG. 4, the first separate chamber 20 is expanded toward the front of a first passenger (P1), and the second separate chamber 30 is expanded toward the front of a second passenger (P2) located in rear of the first passenger (P1), so that the first passenger (P1) may be located at a space between the first separate chamber 20 and the second separate chamber 30.

Seats of the vehicle may be coupled to a vehicle body to enable swiveling against the vehicle body. When a seat swivels, the passengers (P1 and P2) may be seated with a posture in which the passengers (P1 and P2) face each other, or may be seated with a posture in which the passengers (P1 and P2) look the same direction (forward direction).

In the above case, the first separate chamber 20 may be expanded toward the front of the first passenger (P1), and the second separate chamber 30 may be expanded toward the front of the second passenger (P2) from the rear of the first passenger (P1). Therefore, the first separate chamber 20 and the second separate chamber 30 may protect the front of the first passenger (P1) and the front of the second passenger (P2), respectively.

Figure 5:
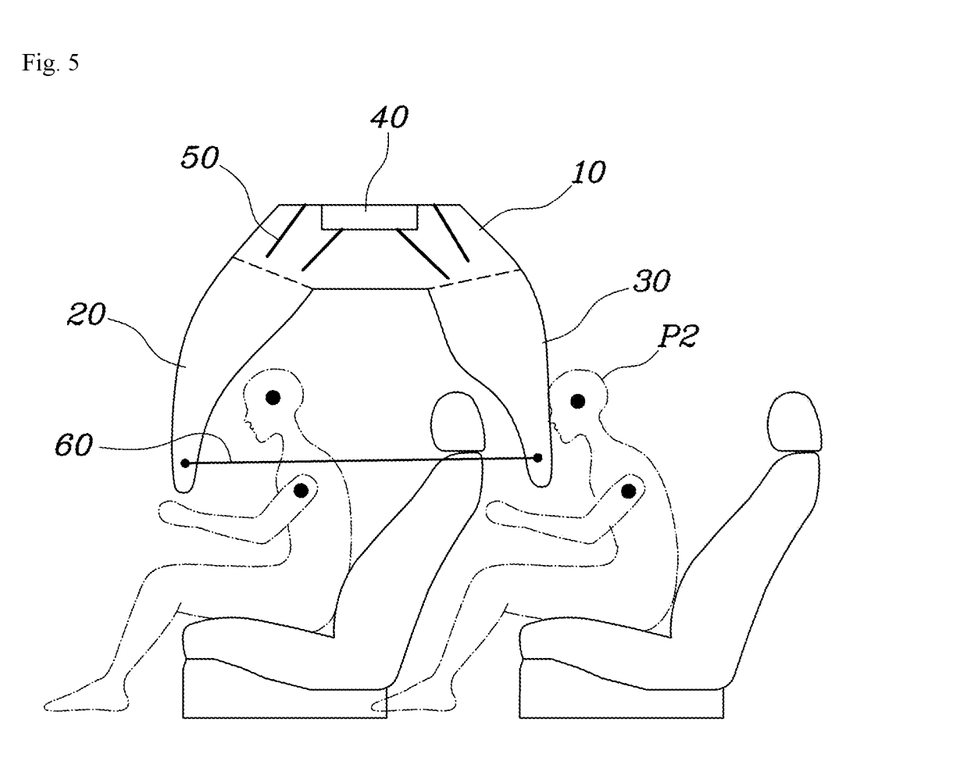
FIGS. 5 to 7 are views showing expanded states of the roof mounted airbag according to various embodiments of the present invention.
Figure 6:
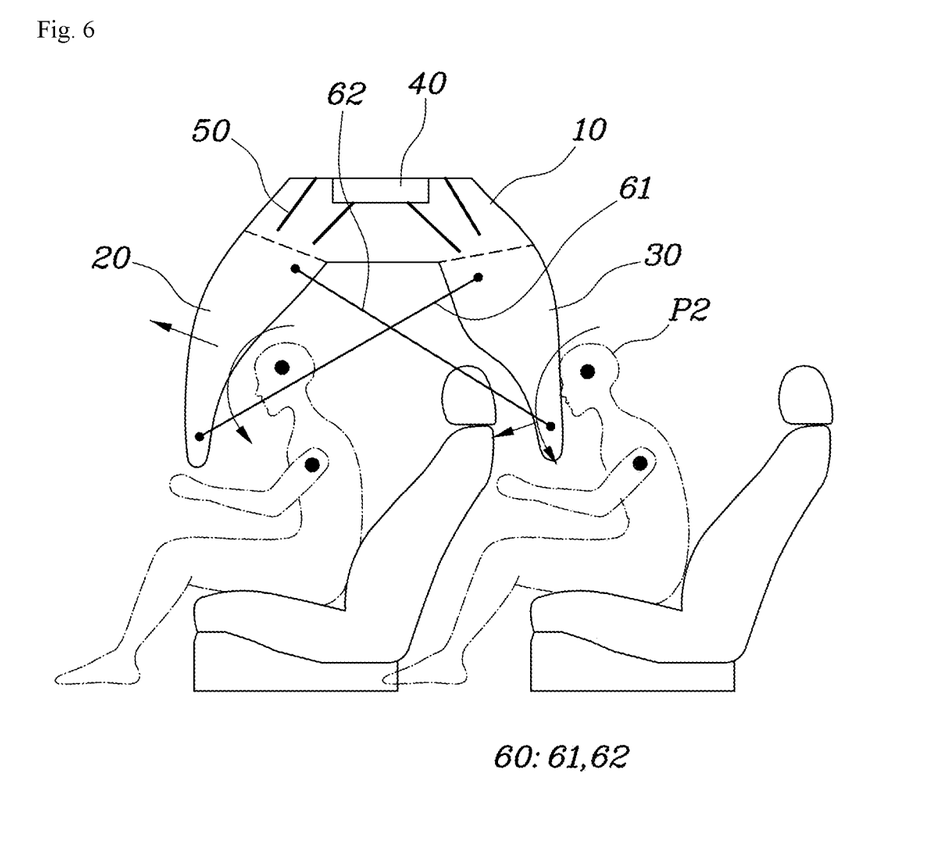
Figure 7:
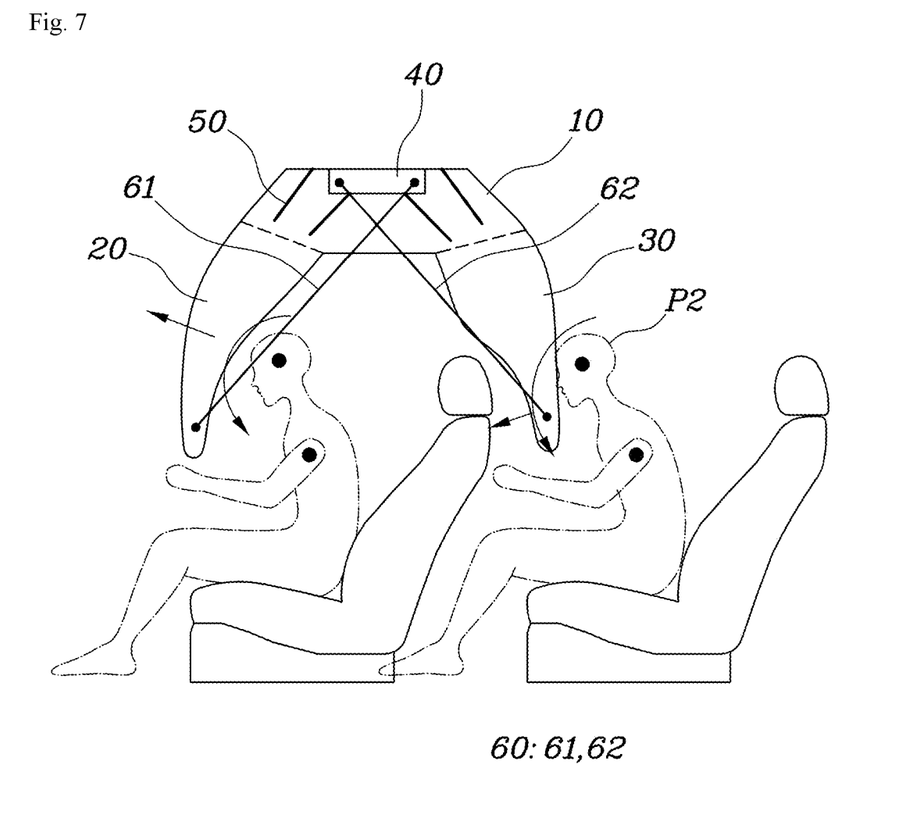

FIGS. 5 to 7 are views showing expanded states of the roof mounted airbag according to various embodiments of the present invention.

Referring to FIGS. 5 to 7, the roof mounted airbag may include a connection tether 60 connected to the first separate chamber 20 or the second separate chamber 30 to restrain the turning of the first separate chamber 20 or the second separate chamber 30.

The connection tether 60 may be an inner tether extended from the inside of the first separate chamber 20 or the second separate chamber 30 and coupled to the end thereof. Alternatively, the connection tether 60 may be an outer tether extended at the outside of the first separate chamber 20 and the second separate chamber 30 and coupled thereto.

The connection tether 60 fixed to the vehicle body or the fixed chamber 10 may restrain or guide the turning of the first separate chamber 20 and the second separate chamber 30 on the basis of the fixed chamber 10.

As an embodiment, as shown in FIG. 5, a first end of the connection tether 60 may be connected to the first separate chamber 20, a second end thereof may be coupled to the second separate chamber 30. In other words, the connection tether 60 may connect the first separate chamber 20 and the second separate chamber 30 to each other so as to prevent the first separate chamber 20 and the second separate chamber 30 from being turned in directions in which the first separate chamber 20 and the second separate chamber 30 are spaced apart from each other.

In particular, the connection tether 60 may be coupled to the downward-extended end of the first separate chamber 20 or the second separate chamber 30. Accordingly, it is possible to efficiently prevent the first separate chamber 20 and the second separate chamber 30 from being turned.

As shown in FIG. 6, the connection tether 60 may include a plurality of connection tethers.

Specifically, the connection tether 60 may include a first tether 61 having a first end coupled to the first separate chamber 20 and a second end coupled to the second separate chamber 30; and a second tether 62 having a first end coupled to the first separate chamber 20 above a coupling portion of the first tether 61 and a second end coupled to the second separate chamber 30 below the second tether 62 to cross the first tether 61.

The first tether 61 and the second tether 62 are extended in directions cross each other, and the first end of the first tether 61 may be coupled to the first separate chamber 20 at a portion higher than a portion where the first end of the second tether 62 is coupled thereto, and the second end of the first tether 61 may be coupled to the second separate chamber 30 at a portion lower than a portion where the second end of the second tether 62 is coupled thereto.

Furthermore, the connection tether 60 may be extended from the outside of the first separate chamber 20 or the second separate chamber 30, and may be arranged at the side of the first separate chamber 20 or the second separate chamber 30.

The connection tether 60 may be arranged at each of opposite outside surfaces of the first separate chamber 20 and the second separate chamber 30.

As another embodiment, as shown in FIG. 7, the connection tether 60 may have a first end fixed to the vehicle body or the fixed chamber 10 and a second end coupled to the end of the first separate chamber 20 or the second separate chamber 30.

The connection tether 60 may have the first end that is fixed to the vehicle body or the fixed chamber 10 and extended from the inside or the outside of the first separate chamber 20 or the second separate chamber 30 in a direction parallel to the first separate chamber 20 or the second separate chamber 30, and may have the second end coupled to the end of the first separate chamber 20 or the second separate chamber 30.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A roof mounted airbag comprising:
a fixed chamber having a first inner space and an upper portion fixed to a roof of a vehicle and configured to expand downwardly when gas is supplied into the first inner space;
a first chamber connected to the fixed chamber, having a second inner space connected to the first inner space of the fixed chamber, and configured to expand downwardly when the gas is supplied into the second inner space from the first inner space of the fixed chamber; and
a second chamber connected to the fixed chamber and spaced apart from the first chamber, having a third inner space connected to the first inner space of the fixed chamber, and configured to expand downwardly when the gas is supplied into the third inner space from the first inner space of the fixed chamber,
wherein the vehicle comprises first and second seats, the first seat configured to swivel such that a first passenger seated on the first seat faces in (1) a first direction toward the second seat or (2) a second direction opposite to the first direction,
wherein, when the first seat is oriented such that the first passenger faces in the first direction, the expanded first chamber is positioned between the first passenger and a second passenger seated on the second seat, and
wherein, when the first seat is oriented such that the first passenger faces in the second direction, the expanded first chamber is positioned in front of the first passenger and the expanded second chamber is positioned between the first seat and the second passenger.

2. The roof mounted airbag of claim 1, wherein the first or second chamber is configured to be turned or bent with respect to the fixed chamber when an external pressure is applied to the first or second chamber in an expanded state.

3. The roof mounted airbag of claim 1, wherein the first or second chamber is configured, when the gas is supplied thereto, to expand toward a front of a passenger, and has a curved shape protruding toward the passenger when expanded.

4. The roof mounted airbag of claim 1, wherein the first or second chamber is configured to extend below a center of gravity of an upper body portion of a passenger, the center of gravity being determined based on a shape of an adult having a predetermined height and weight.

5. The roof mounted airbag of claim 1, wherein the fixed chamber is configured, when expanded, to be located above a center of gravity of a head of a passenger, the center of gravity being determined based on a shape of an adult having a predetermined height and weight.

6. The roof mounted airbag of claim 1, wherein the fixed chamber is configured to be located above a location of a head of a passenger without vertically overlapping the head of the passenger, the location of the head of the passenger being determined based on a shape of an adult having a predetermined height and weight.

7. The roof mounted airbag of claim 1, wherein:
the first or second chamber is configured, when expanded, to extend above a center of gravity of a head of a passenger, the center of gravity being determined based on a shape of an adult having a predetermined height and weight, and
the first or second chamber has a surface configured to receive the head of the passenger.

8. The roof mounted airbag of claim 1, further comprising a tether having a first end connected to a vehicle body or the fixed chamber and a second end coupled to the first or second chamber, and configured to extend in a direction substantially parallel to the first or second chamber.

9. A roof mounted airbag comprising:
a fixed chamber having a first inner space and an upper portion fixed to a roof of a vehicle and configured to expand downwardly when gas is supplied into the first inner space;
a first chamber connected to the fixed chamber, having a second inner space connected to the first inner space of the fixed chamber, and configured to expand downwardly when the gas is supplied into the second inner space from the first inner space of the fixed chamber;
a second chamber connected to the fixed chamber and spaced apart from the first chamber, having a third inner space connected to the first inner space of the fixed chamber, and configured to expand downwardly when the gas is supplied into the third inner space from the first inner space of the fixed chamber; and
one or more tethers connected to the first or second chamber to restrain the first or second chamber from turning,
wherein the vehicle comprises first and second seats, the first seat configured to swivel such that a first passenger seated on the first seat faces in (1) a first direction toward the second seat or (2) a second direction opposite to the first direction,
wherein, when the first seat is oriented such that the first passenger faces in the first direction, the expanded first and second chambers are positioned between the first passenger and a second passenger seated on the second seat, and
wherein, when the first seat is oriented such that the first passenger faces in the second direction, the expanded first chamber is positioned in front of the first passenger and the expanded second chamber is positioned between the first seat and the second passenger.

10. The roof mounted airbag of claim 9, wherein the one or more tethers include a first tether having a first end coupled to the first chamber and a second end coupled to the second chamber.

11. The roof mounted airbag of claim 9, wherein the one or more tethers include a first tether coupled to a downward-extended end of the first or second chamber.

12. The roof mounted airbag of claim 9, wherein the one or more tethers include:
a first tether having a first end coupled to the first chamber and a second end coupled to the second chamber; and
a second tether having a first end coupled to the first chamber above a coupling portion of the first tether and a second end coupled to the second chamber below the second tether to cross the first tether.

13. The roof mounted airbag of claim 9, wherein the one or more tethers include a first tether having a first end fixed to the roof of the vehicle or the fixed chamber and a second end coupled to an end of the first or second chamber.

14. The roof mounted airbag of claim 9, wherein the one or more tethers include a first tether extending from an outside of the first or second chamber and arranged at a side of the first or second chamber.

15. A roof mounted airbag comprising:
- a fixed chamber having a first inner space and an upper portion fixed to a roof of a vehicle and configured to expand downwardly when gas is supplied into the first inner space;
- a first chamber connected to the fixed chamber, having a second inner space connected to the first inner space of the fixed chamber, and configured to expand downwardly when the gas is supplied into the second inner space from the first inner space of the fixed chamber;
- a second chamber connected to the fixed chamber and spaced apart from the first chamber, having a third inner space connected to the first inner space of the fixed chamber, and configured to expand downwardly when the gas is supplied into the third inner space from the first inner space of the fixed chamber; and
- a tether connected to the first or second chamber to restrain the first or second chamber from turning,
- wherein the first chamber is configured to deploy toward and in front of a first passenger, and
- wherein the second chamber is configured to deploy toward and in front of a second passenger located in rear of the first passenger, so that the first passenger is located at a space between the first and second chamber.

* * * * *